US006496201B1

(12) United States Patent
Baldwin et al.

(10) Patent No.: US 6,496,201 B1
(45) Date of Patent: Dec. 17, 2002

(54) SYSTEM AND USER INTERFACE FOR MULTIPARTY CONFERENCING

(75) Inventors: Wayne Ross Baldwin, Cedar Park, TX (US); Travis Madison Cardwell, Lockhart, TX (US); Vincent J. Meriwether, Round Rock, TX (US); Richard Dennis Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,449

(22) Filed: Sep. 30, 1999

(51) Int. Cl.⁷ ............................................... G06F 15/00
(52) U.S. Cl. ..................... 345/753; 348/14.08; 709/204
(58) Field of Search ................................ 345/700, 716, 345/719, 727, 733, 751, 753, 756, 758, 759, 764, 781, 788, 798–800, 810, 821, 823, 835, 840, 866; 348/14.01, 14.03, 14.07, 14.08, 14.09, 14.1, 14.11; 709/204

(56) References Cited

U.S. PATENT DOCUMENTS

| 4,653,090 A | * | 3/1987 | Hayden ....................... 345/839 |
| 5,195,086 A | * | 3/1993 | Baumgartner et al. ....... 345/753 |
| 5,594,859 A | * | 1/1997 | Palmer et al. ............... 345/753 |
| 5,627,978 A | * | 5/1997 | Altom et al. ................ 345/758 |
| 5,657,246 A | * | 8/1997 | Hogan et al. ............. 348/14.01 |
| 5,758,079 A | * | 5/1998 | Ludwig et al. .............. 345/753 |

* cited by examiner

Primary Examiner—Crescelle N. dela Torre
(74) Attorney, Agent, or Firm—Joseph P. Lally; Casimer K. Salys; Mark E. McBurney

(57) ABSTRACT

A system, conferencing application, and graphical user interface for supporting standards based, multiparty teleconferencing, video conferencing, and application sharing are disclosed. The system includes a hardware platform such as a desktop computer, a network computer, or a workstation computer. The hardware platform includes one or more processors, and a system memory as well as input and output devices for user interaction. Conferencing hardware such as a microphone and speakers for audio content and a video camera for video content are interfaced to the hardware platform, typically through an I/O bus of the hardware platform. The system further includes operating system software residing at least in part in memory. The operating system controls execution of application programs on the hardware platform. The system further includes an application for participating in a multi-party conferencing session. The conferencing application generates a graphical user interface that includes a call control section for managing an active conferencing session, a phone control section, including video windows displaying video content of one or more parties to the conferencing session, and a mode section for facilitating access to another conferencing system.

29 Claims, 5 Drawing Sheets

SYSTEM AND USER INTERFACE FOR MULTIPARTY CONFERENCING

BACKGROUND

1. Field of the Present Invention

The invention is related to the field of teleconferencing, video conferencing, and application sharing, and more particularly to a user friendly application and interface for standards based, multiparty conferencing.

2. History of Related Art

Conferencing applications, in which two or more parties communicate audio, video, and other information over a network such as a local area network or the internet, are becoming increasingly popular for business and consumer applications. Several characteristics of multiparty conferencing make it challenging to design an efficient and user friendly conferencing application. For example, multiparty conferencing is typically used in a networked application environment where it is not uncommon to experience delays in call setup because of heavy network traffic, latency in the sending and receiving of audio, and irregular video frame rate. Without a properly designed application, a conferencing user might assume that one or more of these symptoms is caused by improper use, a faulty connection, or some other cureable problem and attempt to interrupt or otherwise interact with the application at an inappropriate time. Moreover, users of a particular conferencing platform such as a video conferencing system typically include both knowledgeable users, who may have regularly scheduled conferencing sessions, and one-time users who are thoroughly unfamiliar with the specifics of multiparty conferencing. Unlike desktop computer interfaces, conferencing applications cannot be designed under the assumption that the user has a working familiarity with the system. Thus, a conferencing application is ideally designed with a simple, clear, and intuitive interface that permits competent use by the novice while simultaneously allowing a range of functions for more familiar and skilled operators. In addition, the growing popularity of teleconferencing, video conferencing, and application sharing has resulted in the introduction of conferencing standards designed to facilitate the development and growth of this emerging technology. Among such standards, perhaps the most widely accepted are the ITU-T Recommendation H.323, Packet-Based Multimedia Communication Systems (the H.323 standard) for audio and video content and the ITU-T Recommendation T.120, Data Protocols For Multimedia Conferencing (the T.120 standard) for data, both propagated by The International Telecommunication Union (ITU). These standards, both available from the ITU at: Sales service, International Telecommunication Union, Place des Nations, CH-1211 Geneva 20 (website: www itu int), are incorporated by reference herein. The H.323 and T.120 standards rigorously mandate almost every level of call setup and management and are difficult to comprehend and use for all but the most formally initiated users. A well designed conferencing application must support and adapt the complexity inherent in the existing body of standards while providing a useable interface to enable productive use by casual users. Unfortunately, currently available conferencing applications fail to achieve one or more of theses objectives. Therefore, it is desirable to implement a teleconferencing application that addresses these issued by providing a standards based, simple, and user friendly interface that enables reliable and productive usage of a conferencing application independent of the user's level of expertise.

SUMMARY OF THE INVENTION

The invention addresses the problems identified above with a system, a conferencing application, and a graphical user interface for supporting standards based, multiparty teleconferencing, video conferencing, and application sharing. Broadly speaking the system includes a hardware platform such as a desktop computer, a network computer, or a workstation computer. The hardware platform includes one or more processors and a system memory as well as input and output devices for user interaction. Conferencing hardware such as a microphone and speakers for audio content and a video camera for video content are interfaced to the hardware platform, typically through an I/O bus of the hardware platform. The system further includes operating system software residing at least in part in the system memory. The operating system controls execution of application programs on the hardware platform. The system further includes an application for participating in a multiparty conferencing session. The conferencing application generates a graphical user interface that includes a call control section for managing an active conferencing session, a phone control section, including video windows displaying video content of one or more parties to the conferencing session, and a mode section for facilitating access to another conferencing system.

In one embodiment, the call control section of the graphical user interface may include icons for achieving various functions such as a hang-up icon for terminating the conferencing system, a hold icon for placing a party to the conferencing session on hold, and a join icon for adding an additional party to the conferencing session. The mode section of the user interface facilitates access to another conferencing system through the use of a speed dialing menu, a directory server listing, or a call log history menu which appear in response to clicking on an appropriate mode key in the mode section. In one embodiment, each mode key in the mode section of the graphical user interface is associated with a color. In this embodiment, clicking a selected mode key changes the background color of the graphical user interface to the color associated with the selected mode key to provide immediate confirmation to the user. The phone control section may include features such as speaker volume and mute controls, microphone sensitivity and mute controls, a local video display window and a remote video display for each remote party to the conferencing application. In one embodiment, the video windows in the phone control section may be detached or removed for the corresponding video window and placed on the desktop of the system. The video windows themselves are preferably scaleable by dragging the side of a video window.

BRIEF DESCRIPTION OF THE DRAWINGS

Other objects and advantages of the invention will become apparent upon reading the following detailed description and upon reference to the accompanying drawings in which.

Figure 1:
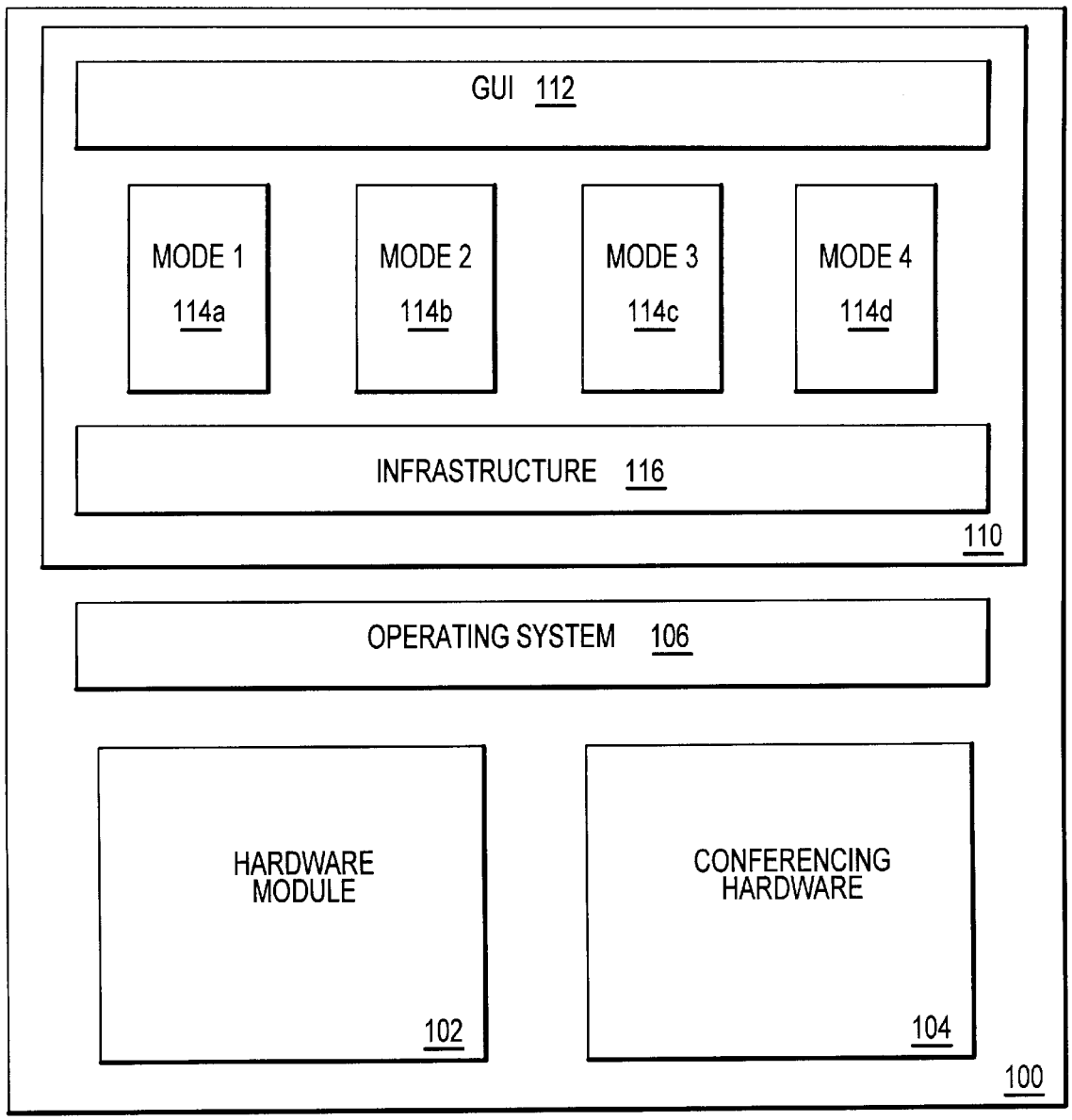
FIG. 1 is a simplified block diagram of a system suitable for executing a conferencing application according to one embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram of a conferencing system 100 for facilitating multiparty conferencing including teleconferencing, video conferencing, and application sharing. System 100 is optimized to service a large number of simple and complex conferencing scenarios. In the preferred embodiment, system 100 features cross-platform desktop video conferencing support, shared white boards, chat sessions, and file transfer support. System 100 emphasizes a graphical user interface (GUI) 112 optimized to provide simple point and click access to each of the features. GUI 112 as described in greater detail below utilizes a unique and consistent graphic theme that includes a set of mode selection keys, a call control section, as well as a phone control workspace. The GUI 112 facilitates consistent and reliable usage for both the one-time only user as well as the regular user. Preferably, system 100 is designed for full compatibly with the H.323 and T.120 standards.

Figure 5:
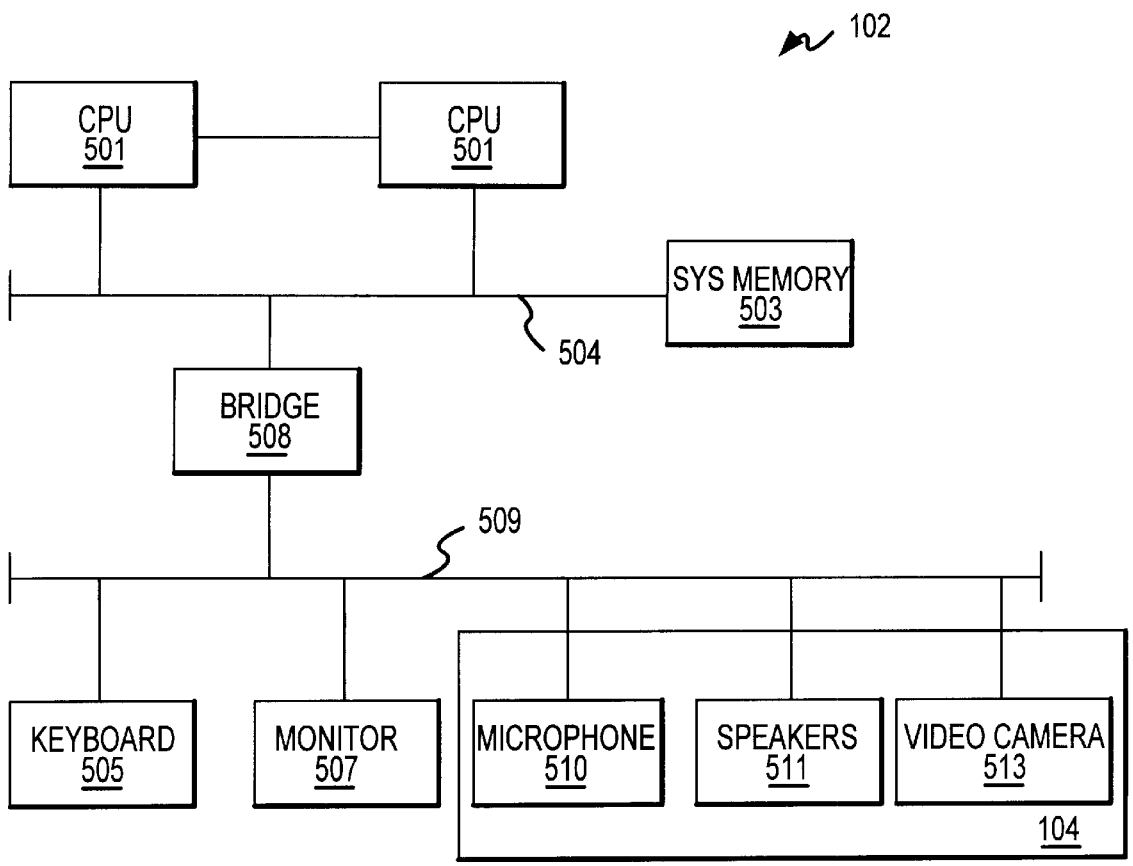
FIG. 5 is a simplified block diagram of a computer system suitable for use as the hardware module of the system of FIG. 1.

System 100 includes a hardware module 102 and conferencing hardware 104 typically including a microphone, speakers, and preferably a video camera. Hardware module 102 may be implemented as a computer system such as a desktop or workstation type computer system. Turning briefly to FIG. 5, an exemplary hardware module 102 includes one or more processors 501, with access to a system memory 503 via a host bus 504. Module 102 further includes an input device 505 such as a keyboard or mouse or both and a display or video monitor 507. In one embodiment, the conferencing hardware 104 includes a microphone 509, speakers 511, and a video camera 513 that communicate with processors 501 of hardware module 102 through an I/O bus 509 of hardware module 102. In one embodiment, for example, processors 501 communicate with the devices in conferencing hardware 104 through a primary bus bridge 508 coupled between host bus 504 and I/O bus 509. In one embodiment, I/O bus 509 is compliant with Peripheral Component Interface (PCI) Local Bus Specification Rev. 2.2. Detailed information regarding the PCI specification is available from the PCI Special Interest Group (www pcisig com). The processors used in hardware module 102 may comprise any of a variety of commercially distributed processors such as, for example, RS/6000 processors available from IBM Corporation, 68000 type processors available from Motorola, PowerPC processors, as well as x86 processors available from a number of sources. Operating system 108 provides a software framework within which a conferencing application 110 operates. The present invention is designed for cross-platform operation and, as such, is not intended to be limited to any particular operating system software. Suitable operating systems for use in system 100 include the AIX® operating system and OS/2® operating systems available from IBM Corporation, a Macintosh® type operating system available from Apple Computer, a Windows® operating system from Microsoft Corporation, as well as any of a variety of UNIX based operating systems.

In the depicted embodiment, conferencing application 110 includes an infrastructure layer 116, a set of modes 114a through 114d (generically or collectively referred herein as mode(s) 114), and a GUI 112. Infrastructure 116 provides basic communication between operating system 108 and application 110. In the preferred embodiment, infrastructure 116 complies with an appropriate multiparty telecommunication conferencing protocol. In the preferred embodiment, infrastructure 116 complies with ITU standards H.323 and T.120 for supporting multiparty conferencing and application sharing. Each mode 114 is designed to handle tasks associated with a major group of functions for conferencing application 110. In the depicted embodiment, a set of four modes is utilized. In this embodiment, three of the modes 114 are designed to provide high-level point and click calling access to other conferencing systems using features such as speed-dial, directory server listings, or call history logs. The fourth section 114d of the depicted embodiment is designed to provide relevant information about calls in progress whether the calls are active or on-hold.

Figure 2:
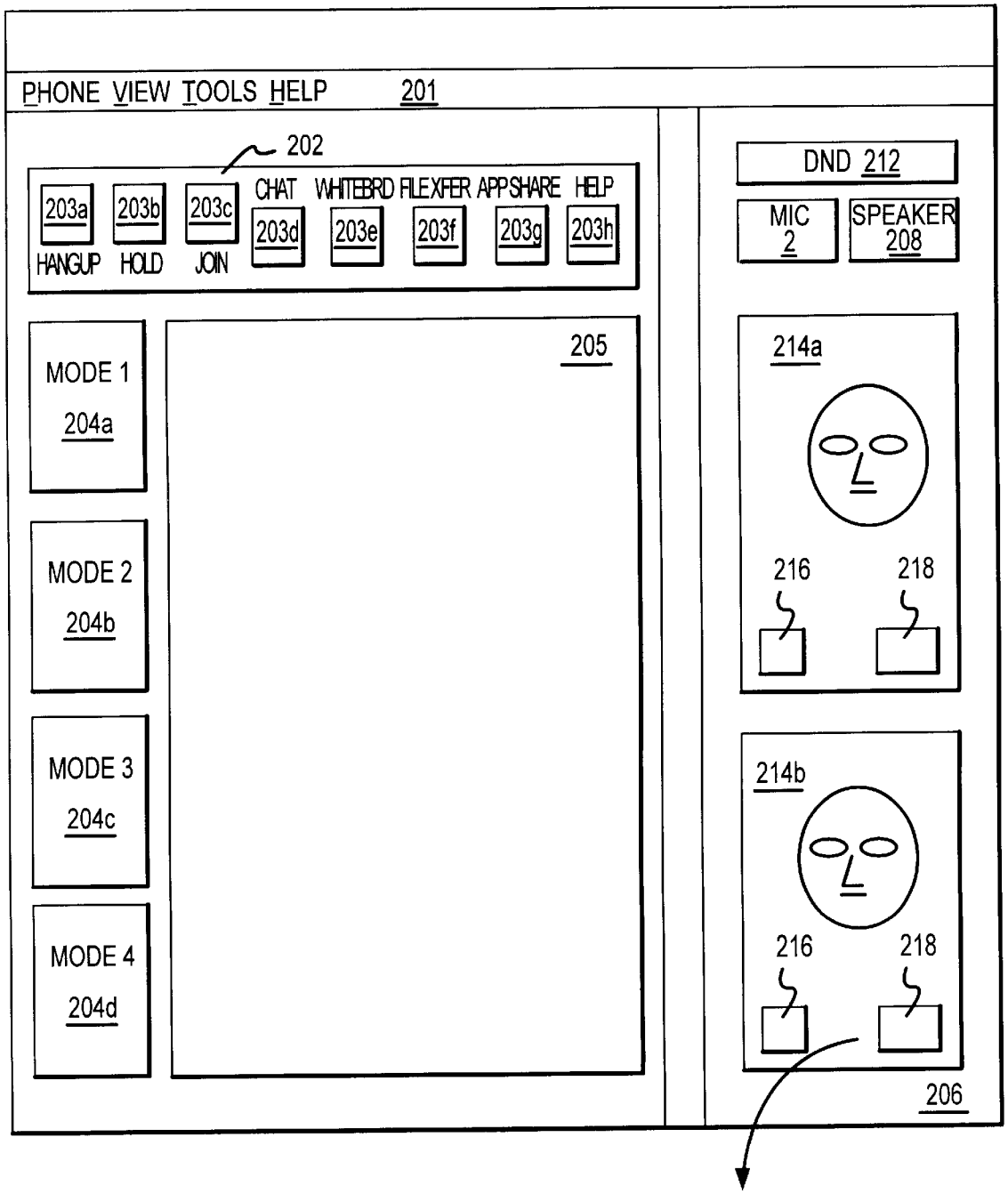
FIG. 2 is an example of an graphical user interface suitable for use with the conferencing application of FIG. 1.

Turning now to FIG. 2, one embodiment of a user interface suitable for use as GUI 112 of conferencing application 110 is depicted. In the depicted embodiment, GUI 112 includes a toolbar 201, a call controls section 202, a mode section including a set of mode icons 204a through 204d (collectively or generically referred to as mode key(s) 204), and a phone control section 206. Toolbar 201 provides a facility for accessing high-level application tools and commands through conventional click and drop type menus. Toolbar 201, may include, for example, an application help menu, a view menu suitable for controlling various viewing options, as well as numerous other features. Call control center 202 provides a simple point and click facility containing all of the necessary high-level icons for managing active calls. In the depicted embodiment, call control center 202 includes a hang-up icon 203a for terminating an active call, a hold icon 203b to place an active caller on-hold, and a join icon 203c for adding a third or additional party to an existing session. In addition, the depicted embodiment of call controls 202 includes a chat icon 203d, a white-board icon 203e, a file transfer icon 203f, an application share icon 203g, and a helper icon 203h. Chat icon 203d provides a facility through which two or more parties in an active call session may send real-time text messages to one another. White-board icon 203e provides a facility through which multiple parties may access a single common workspace. File transfer icon 203f provides a facility for transferring data files between users. Application share icon 203g enables two or more users to share a single software application. Helper icon 203h provides fast access to a help menu to assist new, as well as veteran users of conferencing application 110.

Figure 3:
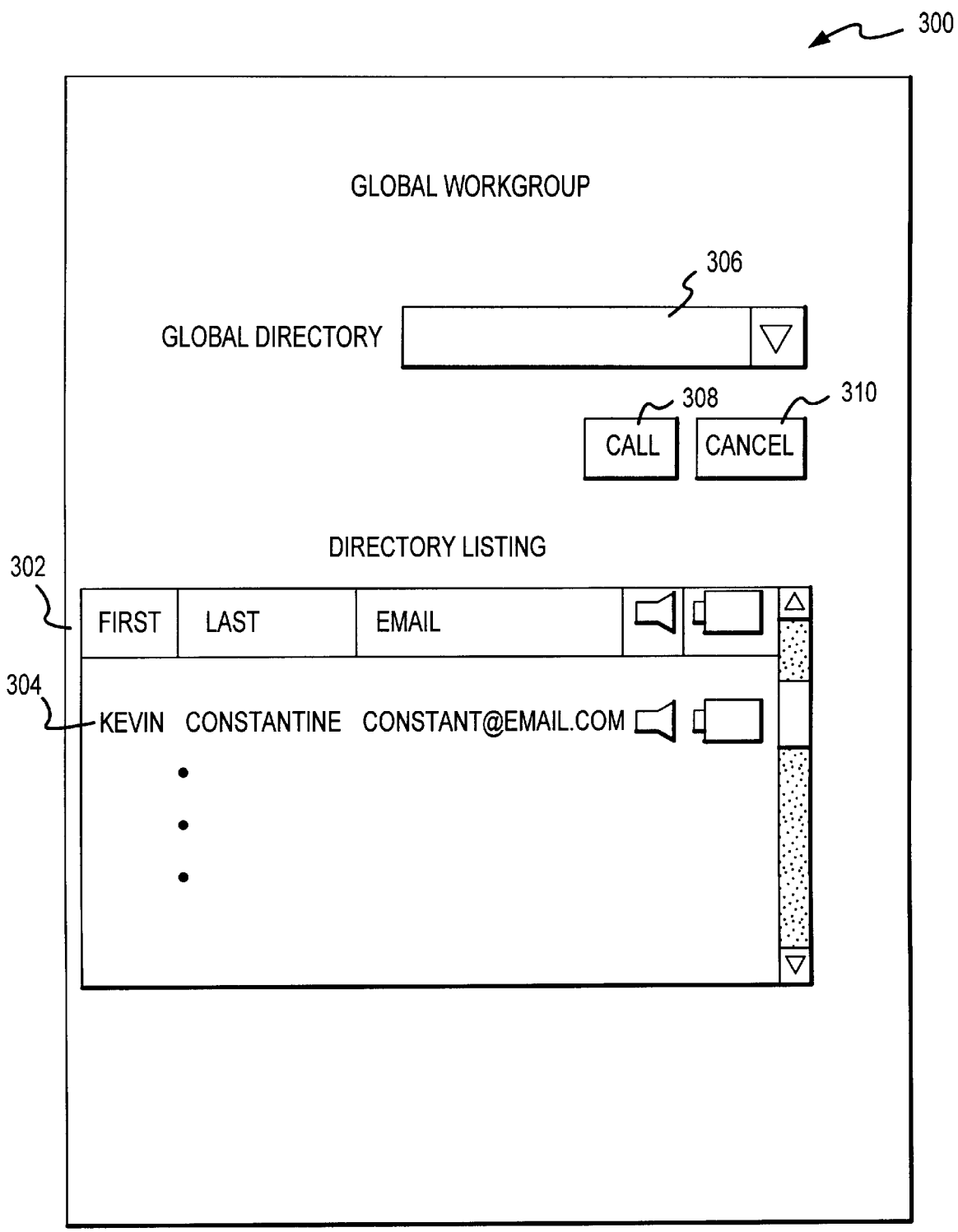
FIG. 3 depicts an exemplary display screen in one mode of use of the graphical user interface of FIG. 2.

Each of the set of mode keys 204 controls the appearance of workspace 205 and invokes a corresponding mode section 114 of application 110 as depicted in FIG. 1. Mode keys 104 facilitate access to other conferencing systems. In the depicted embodiment, mode 204a provides access to a personal work group that is analogous to a speed-dial facility in which a relatively small number of the most frequently contacted parties is maintained. When this key is clicked a list of frequently call parties is displayed in workspace 205 providing a point and click method of initiating a conferencing session with frequently accessed contacts. The second mode key 204b in the depicted embodiment provides access to a global work group facility including a directory server listing reminiscent of a phone book in which a large number of users are listed. Turning momentarily to FIG. 3, an embodiment of the screen displayed in workspace 205 of GUI 112 when mode key 204b is clicked is presented. Global work group screen 300 includes a directory listing heading row 302 corresponding to a list of users 304. In one embodiment, the directory listing heading row 302 includes columns for user's first names, last names, and email addresses. In addition, the depicted embodiment of global work group screen 302 includes columns indicating whether the identified user's system includes facilities for audio conferencing, video conferencing, or both. If a user has facilities for audio conferencing, for example, the audio icon (a speaker) is indicated in the appropriate column. Similarly, users with video conferencing facilities are easily identified by inspecting directory listing 304. The depicted embodiment of global work group screen 300 includes a drop-down box 306 for selecting the appropriate global directory. For each facility, the universe of available contacts may be categorized by, for example, geographic location, department, or other suitable characteristics to facilitate easy access to a large number of users in an organized manner. Global work group screen 300 further includes a call button 308 and a cancel button 310 to provide immediate calling access to persons listed in directory 304.

Figure 4:
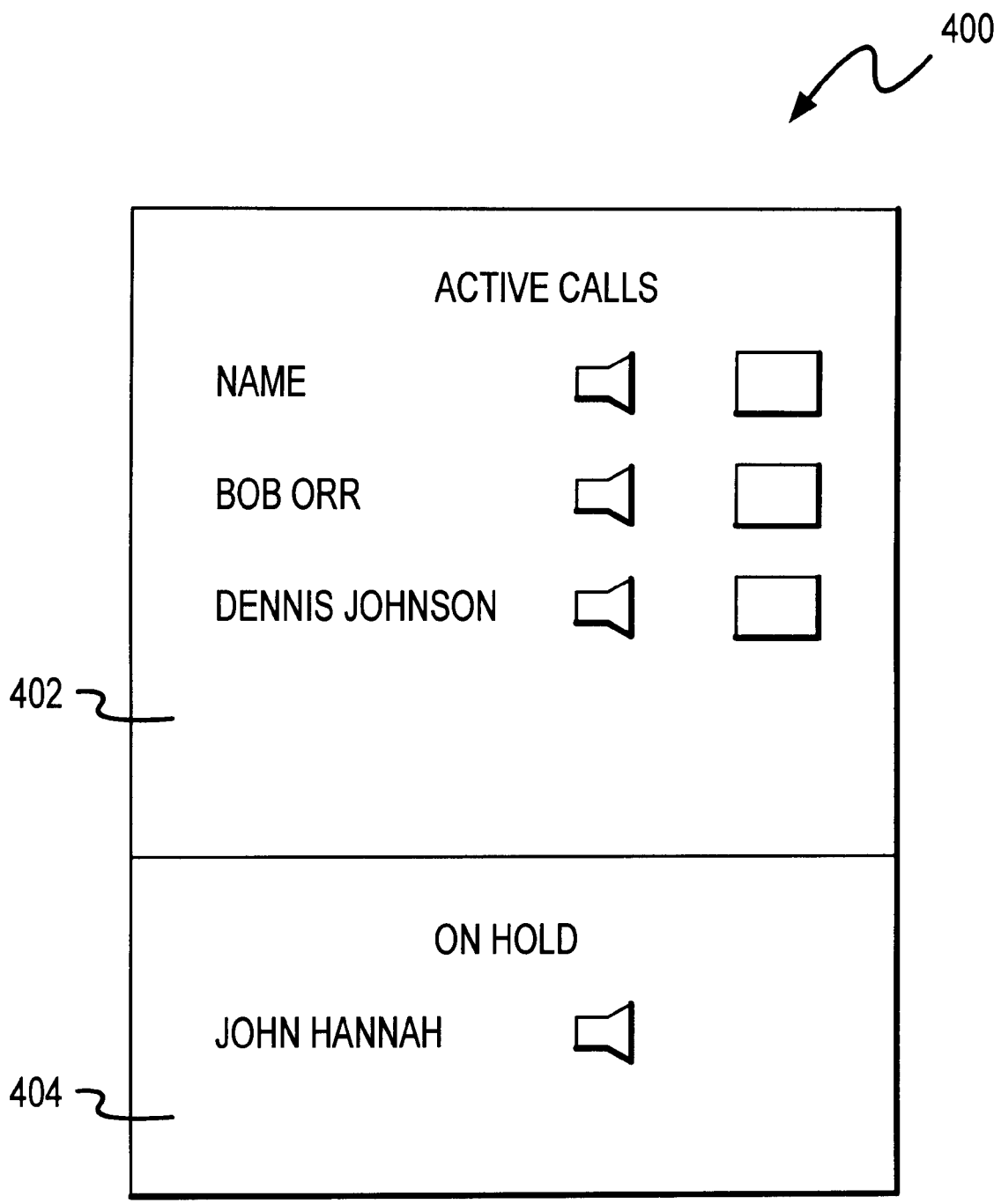
FIG. 4 illustrates and exemplary display screen for use with one mode of the graphical user interface of FIG. 2.

Returning now to FIG. 2, the third mode key 204c, in one embodiment, provides a call history log in workspace 205 through which the user can determine which persons he or she has most recently contacted and facilities for easily initiating a call to a user listed in the call log. In the depicted embodiment, a fourth mode key 204d provides the user with all relevant information about call in progress whether the call is active or on-hold. When a user clicks on mode key 204d, an active call screen 400 as depicted in FIG. 4 is displayed in workspace 205 of GUI 112. Call screen 400 includes an active call section 402 and an on-hold section 404. Active call section 402 indicates the people actively connected to the current session. In the depicted embodiment, active call section 402 further includes indicators of whether each user has audio facilities, video facilities, or both. On-hold section 404 indicates the users that have been temporarily placed on-hold. A user may be placed on-hold by another user by clicking on the hang-up icon 203a in call control section 202 of GUI 112. When on-hold, a user is prevented from receiving audio, video, and data content of the conferencing session. Call screen 400 is designed to provide clear and immediate indication of the parties to a multiparty conferencing session. Because the present invention specifically contemplates use in a multi-party (i.e., greater than 2 parties) conferencing session, the ability to quickly determine the active and on-hold participants in the call is highly desirable and functional. In one embodiment of the invention, each mode key 204 is associated with a particular color such that when the user clicks on the mode key, the background color of GUI 112 changes to conform to the color of the appropriate mode selection key 204. Through this mechanism, GUI 112 provides a high level of confirmation that enables the user to know where in GUI 112 he or she is currently located.

Returning now to FIG. 2, GUI 112 in the preferred embodiment includes a phone control workspace 206 designed to provide a focal point for all active call content. Phone control workspace 206 includes a speaker icon 208 for controlling speaker volume and speaker mute, a microphone icon 210 for controlling microphone sensitivity and microphone mute, and a do-not-disturb icon 212. Phone control workspace 206 further includes video windows 214. Each video window 214 includes an interactive on/off control 216 and a detach button 218. On/off button 216 enables a user to temporarily halt the display of the video content. A user may, for example, turn off the video display of himself or herself. By clicking on the detach button 218, the corresponding video window 214 may be moved from workspace 206 to the workstation desktop. Phone control workspace 206 may be scaled by grabbing the window frame with a mouse cursor and moving the outside edge of workspace 206 to the desired location on the screen. Enlarging workspace 206 provides more room for additional video windows 214 in a multiparty session environment. Additionally, active chat sessions, shared white-board, or other conferencing features of conferencing application 110 may appear in phone control workspace 206. Similarly, phone control workspace 206 may be reduced in size to maximize space available on a users display for other applications. Phone control workspace 206 is implemented, in one embodiment, with a neutral gray background to provide a high degree of differentiation between phone control workspace 206 and the remaining sections of GUI 112. In one embodiment, video windows 214 are scaleable to full screen size to maximize the usability and viewing area of any video content. In addition, video windows 214 may be placed in the background of another active application window to maximize the usability of the workstation during an active call.

Conferencing application 110, in one embodiment, further includes facilities for optimal window placement. Normal usage of conferencing application 110 involves spawning separate windows for detaching external video windows 214 as discussed above, displaying options panels, and error messages, and for other purposes. To facilitate detection of the spawned windows, GUI 112 contains two primary modes for launching external windows. In a first mode, based on predictability, critical error messages are displayed in a consistent predetermined location on the user's screen. A second window spawning mode is based on an intelligent algorithm for determining available space on the display. When a video window 214 is detached and launched outside of the primary GUI 112 window, conferencing application 110 identifies the presence of other windows on the user's display with respect to the size of the window to be spawned and automatically places the new window in an optimal location to minimize interference or viewing conflict with other applications including conferencing application 110.

Conferencing application 110 further includes a variety of other features designed for ease of use. In one embodiment, user application 110 includes a unique microphone and speaker test window available through a tool menu in tool bar 201 for trouble shooting audio problems and adjusting volume sensitivity settings. In one embodiment, conferencing application 110 includes support for full duplex audio content to maximize voice quality and continuity in a conferencing session. To facilitate proper use by especially new users of conferencing application 110. High profile progress indicators provide active feedback to indicate when the application is loading, ready, and busy for call setup in other normal but potentially time consuming tasks.

It will be apparent to those skilled in the art having the benefit of this disclosure that the present invention contemplates a solution for standards based, multiparty conferencing. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A conferencing system, comprising:
   a hardware platform including processor, memory, input, and display means;
   conferencing hardware;
   an operating system, at least partially residing in the memory of the hardware platform and suitable for controlling execution of application programs; and
   a conferencing application suitable for supporting a multiparty conferencing session;
   wherein the conferencing application generates a graphical user interface (GUI) including a call control section for managing an active conferencing session, a phone control section, including means for generating video windows that are detachable from the GUI and that display video images of one or more parties to the conferencing session, and a mode section for facilitating access to another conferencing system; and
   wherein the GUI is further configured to generate a first external window responsive to a first type of event and a second external window responsive to a second type of event, wherein the GUI includes means for determining placement on the display of the external window according to the event type.

2. The system of claim 1, wherein the call control section includes at least one icon selected from a group of icons including a hang-up icon for terminating the conferencing system, a hold icon for placing a party to the conferencing session on hold, and a join icon for adding an additional party to the conferencing session.

3. The system of claim 1, wherein access to another conferencing system is facilitated by a speed dialing menu appearing in response to clicking on a mode key in the mode section.

4. The system of claim 1, wherein access to another conferencing system is facilitated by a directory server listing appearing in response to clicking on a mode key in the mode section.

5. The system of claim 1, wherein access to another conferencing system is facilitated by a call log history menu appearing in response to clicking on a mode key in the mode section.

6. The system of claim 1, wherein each of a set of mode keys in the mode section is associated with a color and further wherein clicking on a selected one of the set of mode keys changes the background color of the graphical user interface to the color associated with the selected mode key.

7. The system of claim 1, wherein the phone control section includes speaker volume and mute controls.

8. The system of claim 1, wherein the phone control section includes microphone sensitivity and mute controls.

9. The system of claim 1, wherein the phone control section includes a local video display window and a remote video display for each remote party to the conferencing application.

10. The system of claim 1, wherein each of the video windows includes a detach button for detaching the corresponding video window from the graphical user interface.

11. The system of claim 1, wherein the video windows are scaleable by dragging the side of a video window.

12. The system of claim 1, wherein the conferencing application is adapted to spawn message windows, and wherein the message windows are consistently positioned in a predetermined location on a desktop of the display means.

13. The system of claim 1, wherein the conferencing application is adapted to spawn message windows, and wherein the message windows are positioned according to an algorithm such that interference with existing windows on a desktop of the display is minimized.

14. A graphical user interface (GUI) for use for use in conjunction with a multiparty conferencing application, comprising:
    a call control section for managing an active conferencing session;
    a phone control section, including means for generating video windows that are detachable from the GUI and that display video images of one or more parties to the conferencing session;
    a mode section for facilitating access to another conferencing system; and
    wherein the GUI is further configured to generate a first external window responsive to a first type of event and a second external window responsive to a second type of event, wherein the GUI includes means for determining placement on the display of the external window according to the event type.

15. The graphical user interface of claim 14, wherein the call control section includes at least one icon selected from a group of icons including a hang-up icon for terminating the conferencing system, a hold icon for placing a party to the conferencing session on hold, and a join icon for adding an additional party to the conferencing session.

16. The graphical user interface of claim 14, wherein access to another conferencing system is facilitated by a speed dialing menu appearing in response to clicking on a mode key in the mode section.

17. The graphical user interface of claim 14, wherein access to another conferencing system is facilitated by a directory server listing appearing in response to clicking on a mode key in the mode section.

18. The graphical user interface of claim 14, wherein access to another conferencing system is facilitated by a call log history menu appearing in response to clicking on a mode key in the mode section.

19. The graphical user interface of claim 14, wherein each of a set of mode keys in the mode section is associated with a color and further wherein clicking on a selected one of the set of mode keys changes the background color of the graphical user interface to the color associated with the selected mode key.

20. The graphical user interface of claim 14, wherein the phone control section includes speaker volume and mute controls.

21. The graphical user interface of claim 14, wherein the phone control section includes microphone sensitivity and mute controls.

22. The graphical user interface of claim 14, wherein the phone control section includes a local video display window and a remote video display for each remote party to the conferencing application.

23. The graphical user interface of claim 14, wherein the video windows include detach buttons for detaching the corresponding video window from the graphical user interface.

24. The graphical user interface of claim 14, wherein the video windows are scaleable by dragging the side of a video window.

25. A conferencing application for facilitating a multiparty conferencing session, comprising:
    an operating system interface for communicating with an operating system of a hardware platform; and a graphical user interface (GUI) comprising:
  a call control section for managing an active conferencing session;
  a phone control section, including means for generating video windows that are detachable from the GUI and that display video images of one or more parties to the conferencing session;
  a mode section for facilitating access to another conferencing system; and
  wherein the GUI is further configured to generate a first external window responsive to a first type of event and a second external window responsive to a second type of event, wherein the GUI includes means for determining placement on the display of the external window according to the event type.

26. The conferencing application of claim 25, wherein the call control section includes at least one icon selected from a group of icons including a hang-up icon for terminating the conferencing system, a hold icon for placing a party to the conferencing session on hold, and a join icon for adding an additional party to the conferencing session.

27. The conferencing application of claim 25, wherein each of a set of mode keys in the mode section is associated with a color and further wherein clicking a selected one of the set of mode keys changes the background color of the graphical user interface to the color associated with the selected mode key.

28. The conferencing application of claim 25, wherein the phone control section includes a local video display window and a remote video display for each remote party to the conferencing application.

29. The conferencing application of claim 25, wherein the video windows include detach buttons for detaching the corresponding video window from the graphical user interface.

* * * * *